United States Patent
Ahn

[19]

[11] Patent Number: 5,940,021
[45] Date of Patent: Aug. 17, 1999

[54] APPARATUS AND METHOD FOR MEASURING A CHARACTERISTIC PULSE WIDTH FOR A DATA CHANNEL IN A DATA HANDLING DEVICE

[75] Inventor: Young-Sub Ahn, Suwon, Rep. of Korea

[73] Assignee: SamSung Electronics Co., Ltd., Suwon, Rep. of Korea

[21] Appl. No.: 08/874,129

[22] Filed: Jun. 12, 1997

[30] Foreign Application Priority Data

Jun. 12, 1996 [KR] Rep. of Korea ................. 96 21039

[51] Int. Cl.$^6$ ............... H03M 5/08; H03M 1/00
[52] U.S. Cl. .................. 341/155; 370/212; 375/238
[58] Field of Search .................. 341/155, 110, 341/112; 375/229, 238, 239, 377, 242, 317, 318; 370/212

[56] References Cited

U.S. PATENT DOCUMENTS

| | | | |
|---|---|---|---|
| 3,654,916 | 4/1972 | Neilson | 128/2.06 |
| 4,128,892 | 12/1978 | Vasa . | |
| 4,165,459 | 8/1979 | Curtice . | |
| 4,603,357 | 7/1986 | Ramiréz et al. . | |
| 4,604,571 | 8/1986 | Maier et al. | 324/77 A |
| 4,635,142 | 1/1987 | Haugland . | |
| 4,804,959 | 2/1989 | Makansi et al. . | |
| 4,924,447 | 5/1990 | Fuji et al. . | |
| 4,939,471 | 7/1990 | Werrbach | 328/108 |
| 4,972,398 | 11/1990 | Wachi | 369/44.25 |
| 5,047,967 | 9/1991 | Sander et al. . | |
| 5,107,379 | 4/1992 | Huber | 360/46 |
| 5,122,978 | 6/1992 | Merrill . | |
| 5,339,050 | 8/1994 | Llewellyn | 331/16 |
| 5,367,204 | 11/1994 | Mattison . | |
| 5,436,853 | 7/1995 | Shimohara . | |
| 5,440,433 | 8/1995 | Yun | 360/46 |
| 5,629,914 | 5/1997 | Clark et al. . | |

*Primary Examiner*—Howard L. Williams
*Assistant Examiner*—Peguy JeanPierre
*Attorney, Agent, or Firm*—Robert E. Bushnell, Esq.

[57] ABSTRACT

An apparatus and method for measuring a characteristic pulse width of a data channel for a data handling device, with particular application to an HDD having an automatic gain control amplifier for amplifying a signal reproduced by a magnetic head, a filter/equalizer circuit for removing a noise component from an output signal from the automatic gain control amplifier and wave-shaping the resultant signal, a rectifier for rectifying an output signal from the filter/equalizer circuit, a first low pass filter for low pass filtering an output signal from the rectifier to detect an average value thereof, and a charge pump and a capacitor for cooperating to control an amplification gain of the automatic gain control amplifier in response to an output signal from the first low pass filter. The apparatus comprises a comparator for comparing the output signal from the rectifier with a predetermined reference voltage and generating a pulse signal in accordance with the compared result, a second low pass filter for low pass filtering an output signal from the comparator to detect an average value thereof, and an analog/digital converter for converting an output signal from the second low pass filter into a digital signal. According to the present invention, the apparatus can measure a PW50 value directly in the HDD, thereby providing for implementation of an improved AZO method.

35 Claims, 13 Drawing Sheets

FIG. 10A
FIG. 10B
FIG. 10C COMPARATOR REFERENCE VOLTAGE
FIG. 10D
FIG. 10E
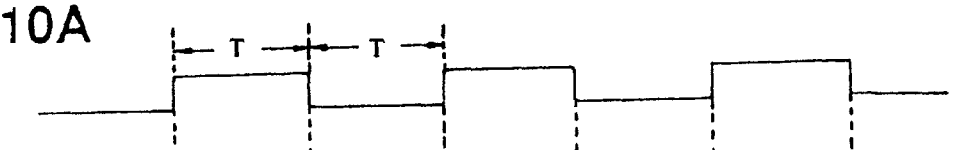
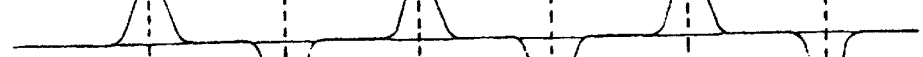
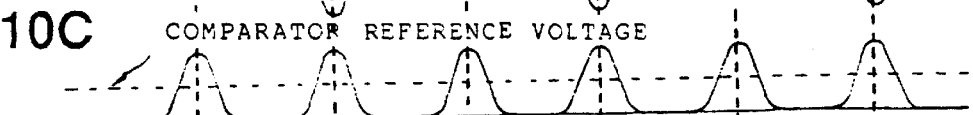
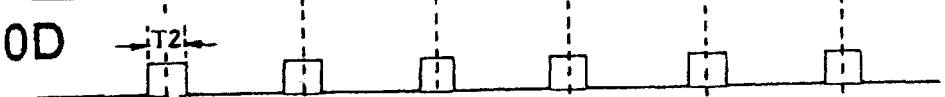
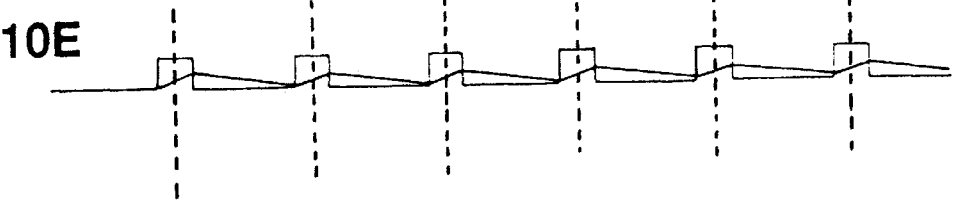

APPARATUS AND METHOD FOR MEASURING A CHARACTERISTIC PULSE WIDTH FOR A DATA CHANNEL IN A DATA HANDLING DEVICE

CLAIM OF PRIORITY

This application makes reference to, incorporates the same herein, and claims all benefits accruing under 35 U.S.C. § 119 from an application for APPARATUS FOR MEASURING CHANNEL CHARACTERISTIC PARAMETER OF HARD DISK DRIVE earlier filed in the Korean Industrial Property Office on Jun. 12, 1996 and there duly assigned Ser. No. 21039/1996, a copy of which application is annexed hereto.

BACKGROUND OF THE INVENTION

1. Field of the Invention

The present invention relates to the field of measuring characteristic parameters of data channels for data handling devices such as data storage devices and data communications devices, and in particular to the field of measuring a characteristic pulse width for such a data channel relative to a reference pulse width. More particularly, the present invention has application to measuring the 50 percent pulse width (PW50) of a data retrieval channel of a hard disk drive (HDD).

2. Description of the Prior Art

Data handling devices, such as data receivers communicating with data transmitters or mass storage devices that retrieve data from mass storage, typically receive data signals from a data source and process them for further use. The characteristics of the data channel provided by the data handling device present limitations on the density with which data can be, for example, stored or transmitted. In particular, such a data channel will have a characteristic pulse width that determines a maximum data density in the subject data signal that the device can process without producing an excessive rate of errors.

This disclosure principally addresses the particular case of characteristic pulse widths for data channels in hard disk drives. However, as persons of ordinary skill in the data signal processing arts will recognize, the present invention has application to a broad range of data handling environments where hardware limitations present limitations on the data density of the data signals that the data handling device can adequately process.

A computer system with an attached HDD typically uses the HDD as a large capacity auxiliary storage device. A suitable HDD for such an application comprises a magnetic disk having a solid substrate of, for example, aluminum on which a magnetic material is coated. A magnetic head records data on the magnetic disk. The HDD also uses the magnetic head to detect and reproduce data signals stored on the magnetic disk. Once the data signal is detected and reproduced, the desired data must be extracted from it. The sophistication of the extraction procedure plays a large role in the maximum data density allowed by the data channel: a more sophisticated extraction procedure permits higher data densities because it more reliably differentiates between closely-spaced data pulses in the data signal.

The peak detector method, a successful technique for data extraction, has been widely used to enhance the permissible density of data recorded on the magnetic disk. In this and similar data recovery methods, noise inevitably is generated as a consequence of inter-symbol interference (ISI). This noise manifests itself in errors that occur when data recorded on the magnetic disk is reproduced. This tendency toward error generation constrains the degree to which the density of data recorded on the magnetic disk can be enhanced.

In order to further enhance data storage densities in HDDs, various alternative techniques have developed to replace the peak detector method. One class of such techniques includes the partial response maximum likelihood (PRML) methods, including PR4, EPR4 and $E^2PR4$. These methods provide enhanced data recovery by utilizing mutual calculations of sampled symbols to offset inter-symbol interference. ISI thus does not constitute a limiting factor for PRML methods on the enhancement of recording density on a magnetic disk.

On the other hand, in PRML methods the so-called user density does become an important limiting factor for enhancement of recording density. User density is defined as the ratio of the PW50 value to the user bit length:

$$\text{USER DENSITY} = \text{PW50}/\text{USER BIT LENGTH} \quad (I)$$

In equation (I), PW50 denotes the pulse width at 50 percent of peak amplitude, which is determined by the characteristics of the magnetic head and disk. The user bit length is defined as the duration of a one-bit data signal on the time axis and has the dimensions of time/data bit. A corresponding data rate may be defined as 1/user bit length and carries the dimensions of data bits/time.

Different data recovery methods, such as the peak detector method as against PR4, generally have different error rates for a given user density. Generally, though, for a given data recovery method the error rate in recovered data increases as a monotonic function of the user density. Each such method therefore has an associated maximum allowable user density, because the user density must be maintained below a specific value in order to maintain the error rate from the method within an acceptable upper limit such as $10^{-11}$. User density therefore constitutes a fundamental limiting factor for all data recovery methods, including the PRML methods, because acceptable performance of the HDD requires that the user density not induce a higher than acceptable error rate.

In this connection, continuous development of the PRML methods, such as PR4, EPR4, and $E^2PR4$, has allowed increased user densities while maintaining error rates within acceptable limits. These developments have yielded increases in the data recording densities available from HDDs. At the level of implementation, an increase in user density is achieved by reducing the user bit length for a given PW50 value through software adjustment of the data write rate relative to the angular speed of the magnetic disk, as is well known in the art.

The PW50 value, on the other hand, does not admit of easy adjustment because it is substantially determined by the physical characteristics of the magnetic head and disk in the HDD. A particular feature of characteristic pulse widths for an HDD, such as the PW50 value, is that the pulse width has different values for head positions in different regions of the disk, and it increases as the head moves toward the center of the disk. This relationship is an inherent consequence of the detector hardware in the head and of the fact that, for a constant angular speed of the disk, the linear speed of the disk surface is slower near the axis of rotation than near the disk edge.

It follows that if the HDD uses a constant user bit length over the entire disk, then the local user density for regions near the disk center will be less than for regions near the edge. Conversely, in order to design the HDD so as to maintain the user density roughly constant over the entire area of the magnetic disk, larger user bit lengths must be used in regions of the magnetic disk closer to the disk center. This criterion is equivalent to requiring that the data rate be reduced as the magnetic head moves toward the center of the magnetic disk, because the data rate is just the reciprocal of the user bit length.

An HDD that makes efficient use of the storage area on the magnetic disk therefore must allow the data rate to be varied at least discontinuously across the surface of the disk. This variation is necessary so that the data rate in use can decrease as the magnetic head moves toward the disk center. Generally the HDD design will specify a piecewise constant data rate: the disk is divided into concentric bands and a constant data rate is applied for each band, with the data rate for each band lower than the data rate for its outer adjacent band.

A key design issue in specifying a piecewise constant data rate for an HDD is where and by how much to make the data rate transitions, i.e., where and how wide the bands should be and by how much the data rate should change between bands. If low data rates are used for a large area of the disk, such as when the bands are relatively wide or data rate transitions are clustered near the disk edge, then the user density for some portions of the disk necessarily will be relatively low. This fact follows from the requirement that the user bit length at every position on the disk cannot be smaller than the minimum value that maintains the local user density below the value that corresponds to the maximum allowable error rate. If the data rate is substantially lower than this minimum value over large areas of the disk, then the overall data recording density will be reduced and, commensurately, the amount of data recordable on the magnetic disk will be reduced.

Thus the efficient design of an HDD includes selecting data rate change points to maintain the recording density as high as possible while maintaining the error rate below the maximum acceptable value. This criterion implicates the PW50 value because the local minimum value for the user bit length depends, through equation (1) and the relationship between user density and error rate, on the local PW50 value. It also complicates selecting a suitable set of data rate change points, because the characteristic pulse width for a data channel provided by a given magnetic head depends on the intrinsic physical characteristics of the head. In particular, the PW50 value at a given point on the disk typically varies significantly, not only from one head design to another, but also from one specific head unit to another. Thus, when a first magnetic head has a PW50 value larger than that of a second head, the HDD design should allow more data rate change points to be used with the first head, in order to provide the same average user density.

Conventionally, the variability in PW50 characteristics among a plurality of magnetic heads has not been treated as a critical issue. Recently, though, in view of the need to increase the recording densities of HDDs, this variability has required data rate change points to be adjusted individually for each magnetic head. A widely-used method for this process has been termed adaptive zone optimization (AZO).

The AZO method adjusts the data rate change points in accordance with the PW50 characteristics of a given head, but it does so only indirectly. The PW50 pulse width for a typical HDD has a value of only tens of nanoseconds. Direct measurement of such intervals in the context of HDD circuitry requires expensive, specialized equipment. Thus, existing implementations of AZO do not measure PW50 values directly, but instead measure the error rates generated by a candidate set of data rate change points. These measurements are typically made for a given band having a constant data rate at the highest user density portion (innermost portion) of the band.

This typical approach to AZO has an inherent limitation because the desired error rate for an HDD typically falls within the range of $10^{-12}$–$10^{14}$. Generating a sufficiently reliable error rate estimate in this range would require several days of testing under normal use conditions, and in such a case the efficiency of AZO would be very low. Thus, in order to reduce the time required to measure the error rate for each zone in an HDD, AZO typically includes application of a stress, such as an offtrack stress, to the HDD to increase the error generation frequency. This enables the AZO method to generate an approximate value of the error rate in an acceptably short testing period. On the other hand, application of such stresses may produce unexpected effects on the performance of the HDD and thereby degrade the reliability of the error rate estimate.

I have therefore found that a need exists for a way to optimize the performance of data handling devices by directly measuring the pulse width characteristics of data channels in such devices. Such an invention would enable implementation of an improved AZO method for selecting data rate change points in HDDs. It would also have direct application in a broad range of data handling devices for which performance must be optimized with regard for the variability of individual hardware components and their characteristics that determine the characteristic data channel pulse width. Such an invention should provide an inexpensive, rapid, and reliable means to measure the characteristic pulse width of individual data handling devices. Preferably it would require little additional hardware to implement in a production environment. Ideally, it could be integrated into the HDD device itself.

SUMMARY OF THE INVENTION

The present invention therefore has a principal object of providing an apparatus and method for directly measuring a characteristic pulse width for a data channel of a data handling device.

A related and particular object of this invention is to provide such an apparatus and method suitable for measuring directly the PW50 value of an HDD in a manner applicable to an AZO method.

To achieve these and other objects, the present invention provides in one aspect an apparatus for measuring a characteristic pulse width for a data channel of a data handling device, the apparatus comprising a comparator, a low pass filter in communication with the comparator, and an analog-to-digital converter in communication with the low pass filter. The comparator receives a rectified input signal corresponding to a predetermined reference datum detected through the data channel. It then compares the rectified input signal to a reference signal representative of a predetermined reference voltage and generates a pulse signal corresponding to a portion of the rectified input signal having a signal level in excess of the predetermined reference voltage. The low pass filter low-pass filters the pulse signal, thereby generating and average value signal representative of an average value of the pulse signal. The analog-to-digital converter converts the average value signal into a digital signal corresponding to the average value, whereby a digital processor can generate from the digital signal a pulse width value representative of the characteristic pulse width.

In an alternative embodiment of this first aspect, the present invention provides a method of measuring a characteristic pulse width for a data channel of a data handling device. The method provided comprises a first step of comparing a rectified input signal to an analog voltage signal and generating a pulse signal corresponding to a portion of the rectified voltage signal having a signal level in excess of the signal level of the analog voltage signal. The rectified input signal corresponds to a predetermined reference datum detected through the data channel. The method continues with a further step of generating an average value signal by low-pass filtering the pulse signal, with the average value signal representative of an average value of the pulse signal. The method also includes a step of converting the average value signal into a digital signal, whereby a digital processor can generate from the digital signal a pulse width value representative of the characteristic pulse width.

In a second aspect, the present invention provides an apparatus for measuring a characteristic pulse width for a data channel of a data handling device, the apparatus comprising a reference voltage means for generating a reference voltage signal, a first comparator in communication with the reference voltage means, and a low pass filter in communication with the first comparator. The reference voltage signal generated by the reference voltage means has an amplitude corresponding to a predetermined fraction of the amplitude of a rectified input signal. The rectified input signal corresponds to a predetermined reference datum detected through the data channel. The first comparator receives the rectified input signal, compares it to the reference voltage signal, and generates a pulse signal corresponding to a portion of the rectified input signal having a signal level in excess of the signal level of the reference voltage signal. The low pass filter generates an average value signal by low-pass filtering the pulse signal, with the average value signal representative of an average value of the pulse signal.

In an alternative embodiment of the second aspect of the invention, a method is provided for measuring a characteristic pulse width for a data channel of a data handling device. The method comprises a first step of comparing a rectified input signal to a reference voltage signal and generating a pulse signal. The reference voltage signal has an amplitude corresponding to a predetermined fraction of the amplitude of the rectified input signal. The pulse signal corresponds to a portion of the rectified input signal having a signal level in excess of the signal level of the reference voltage signal. The rectified input signal corresponds to a predetermined reference datum detected through the data channel. The method includes a further step of generating an average value signal by low-pass filtering the pulse signal, with the average value signal representative of an average value of the pulse signal.

BRIEF DESCRIPTION OF THE DRAWINGS

A more complete appreciation of the present invention, and many of the attendant advantages thereof, will be readily apparent as the same becomes better understood by reference to the following detailed description when considered in conjunction with the accompanying drawings, in which like reference symbols indicate the same or similar components, wherein:

FIG. 5B is a view illustrating piecewise-constant data rate curves for each of the magnetic heads of FIG. 5a;

FIGS. 10A to 10E are waveform diagrams of the output signals from the components in FIG. 8 for a typical case where the PW50 value is smaller;

DETAILED DESCRIPTION OF THE PREFERRED EMBODIMENTS

Figure 1A:
FIG. 1A is a waveform diagram of recording current flowing to a coil of a magnetic head in the HDD for the recording of data on a magnetic disk in the HDD.
Figure 1B:
FIG. 1B is a view illustrating the corresponding pattern of magnetic polarity in the recording medium of the magnetic disk arising from data magnetically recorded on the disk.

In general, an HDD records data on a magnetic disk by applying current to a coil in the magnetic head. FIG. 1A shows a waveform for the current in the coil as data are recorded. FIG. 1B shows the corresponding magnetic polarity induced in the recording medium of the disk in response to the magnetic field set up in the coil by the applied current. These regions of alternating polarity provide a recoverable record of the data represented by the current signals applied to the coil.

Figure 1C:
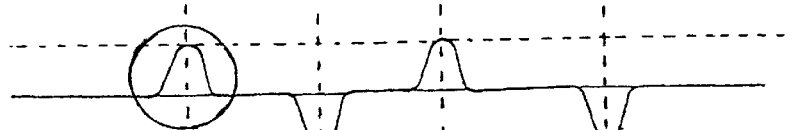
FIG. 1C is a waveform diagram of a signal having a relatively narrow pulse width as reproduced from the magnetic disk.
Figure 1D:
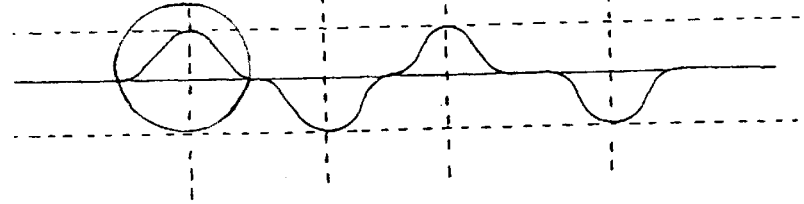
FIG. 1D is a waveform diagram of a signal with a wider pulse width as reproduced from the magnetic disk.

Data signals recorded on the magnetic disk are reproduced by the magnetic head, as shown in FIGS. 1C and 1D. FIG. 1C shows a recovered data signal having a relatively small pulse width, whereas FIG. 1D shows a recovered data signal with a larger pulse width. The size of a characteristic pulse width, such as the PW50 width, will depend on the particular characteristics of the disk and the magnetic head that recovers the data signal from the disk. More specifically, even if identical write signals are applied in each case, such as the write signal with current values given by FIG. 1A, the reproduced data signal will have a narrower or wider characteristic pulse, as illustrated in FIGS. 1C and 1D, respectively, according to the characteristics of the magnetic head and the disk.

Figure 2A:
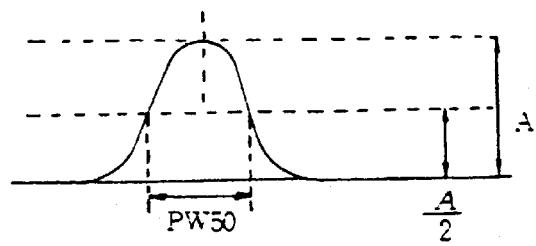
FIG. 2A is an enlarged view of the circled portion of the signal in FIG. 1c, wherein the PW50 value of the signal is graphically illustrated.
Figure 2B:
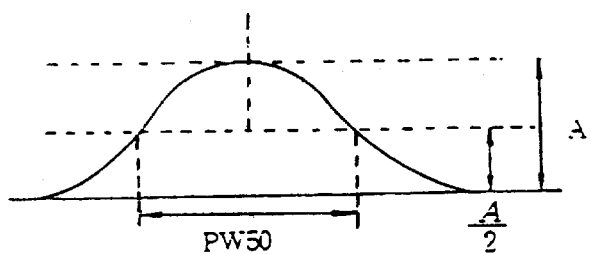
FIG. 2B is an enlarged view of the circled portion of the signal in FIG. 1d, with the larger value of the corresponding pulse width illustrated.

FIGS. 2A and 2B provide enlarged views of the circled portions of the recovered data signals shown in FIGS. 1C and 1D, respectively. As FIGS. 2A and 2B illustrate, the PW50 value is defined as the width of a characteristic pulse width at the level on the pulse corresponding to one half of the level of the pulse amplitude. Thus, if the pulse amplitude is given by A, then the pulse width is the width, on the time axis, between the point at the leading edge of the pulse where the signal level is A/2 and the point at the trailing edge where the signal level is A/2.

Figure 3:
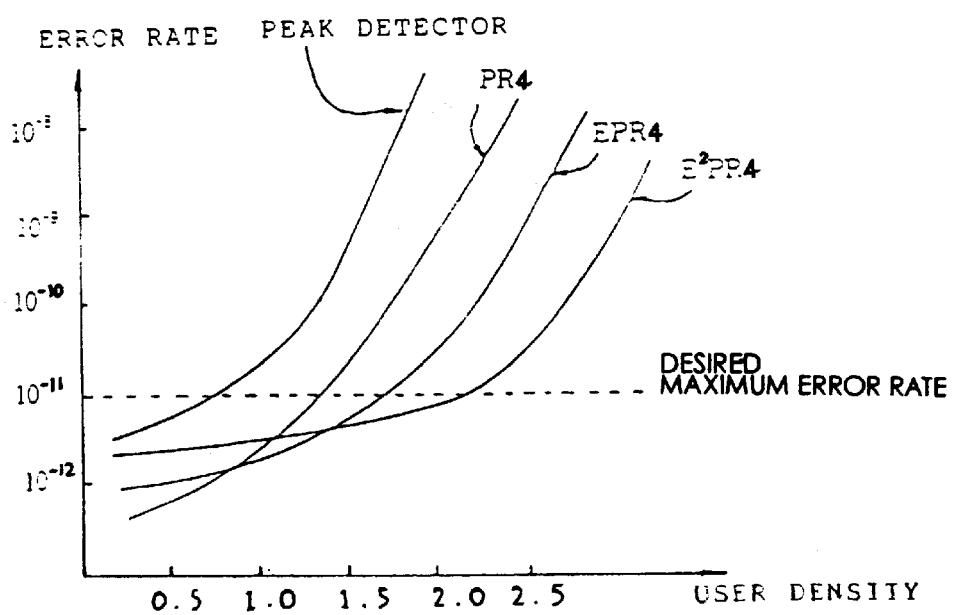
FIG. 3 is a view illustrating the error rates generated by various data recovery techniques as functions of the user density.

FIG. 3 is a view illustrating the variation in error rate as a function of user density for various data signal recovery methods. It can be observed from this figure that the user density corresponding to the desired maximum error rate is about 1 for the peak detector, 1.2–1.8 for PR4, 1.8–2.0 for EPR4, and 2.2–2.4 for $E^2PR4$. Thus, each succeeding improvement in the PRML approach has enabled HDDs to use higher user densities while maintaining their error rates within acceptable limits.

Figure 4:
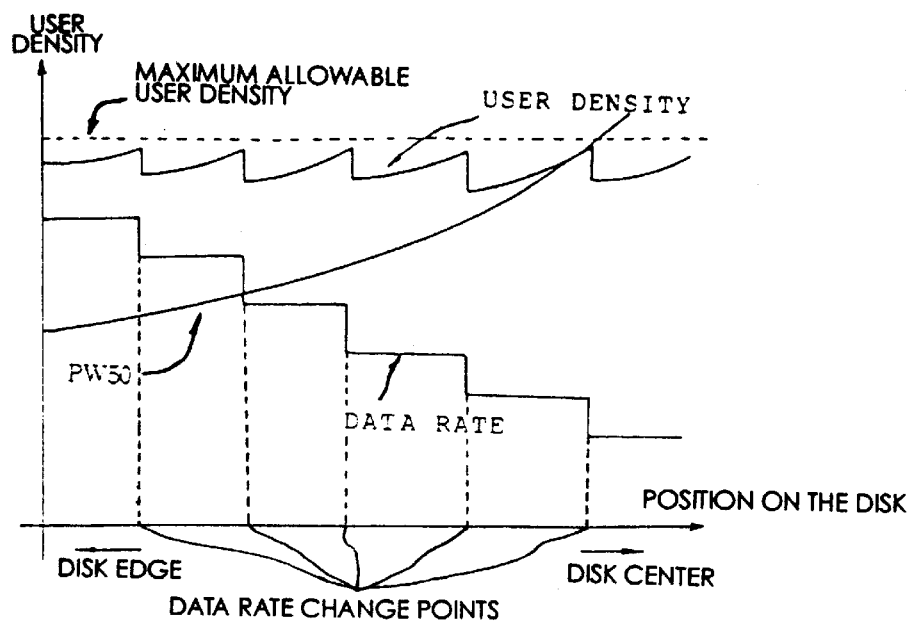
FIG. 4 is a view illustrating a curve of typical PW50 values as a function of position on the disk, a corresponding piecewise-constant data rate curve, and the resulting roughly-constant user density curve.

As noted above, the PW50 value for a given HDD substantially depends on the characteristics of the magnetic head and disk in the HDD. Moreover, as the typical PW50 curve in FIG. 4 illustrates, the PW50 value increases as the magnetic head moves toward the center of the magnetic disk. The data rate curve in FIG. 4 is a typical piecewise-constant data rate curve of the type used in HDDs to offset the effect on the user density of the increasing PW50 value as the head is moved inward. The user density curve in FIG. 4 shows that, with such a piecewise-constant data rate curve, the user density of the HDD can be kept roughly constant across the area of the disk. FIG. 4 also makes clear that a high-performance HDD must be designed to allow the data rate to be varied in at least a piecewise-constant manner so that the user density does not exceed the maximum allowable user density. This maximum is determined by the desired maximum error rate, as indicated in FIG. 3.

The use of a piecewise-constant data rate curve necessitates the selection of a number of data rate transitions or change points. As shown in FIG. 4, data rate change points are those points where the data rate used by the HDD changes from one constant value to another constant value. The relationship between data rate, PW50 value, and user density (given by equation (1) in terms of user bit length) implies further that the locations of suitable data rate change points will depend on the PW50 curve for the HDD.

Figure 5A:
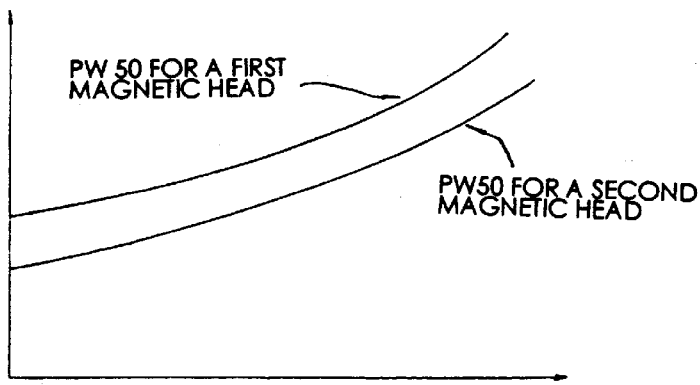
FIG. 5A illustrates the PW50 curves for each of two different but typical magnetic heads.
Figure 5B:
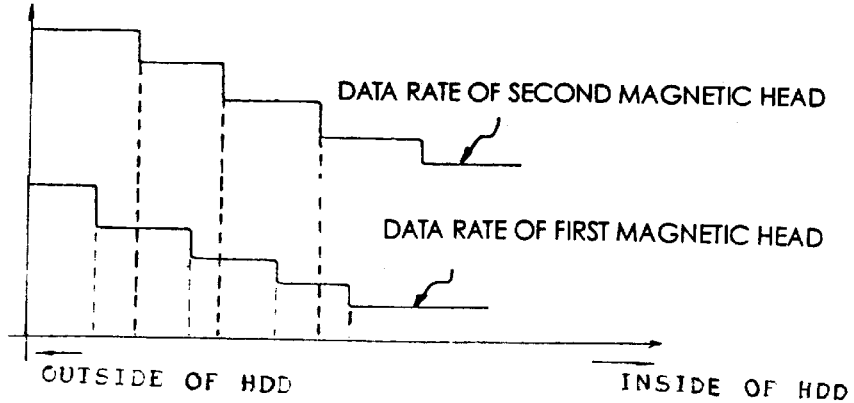

FIGS. 5A and 5B illustrate this dependence more specifically. FIG. 5A shows PW50 curves for each of two different magnetic heads that might be used in a typical HDD, and FIG. 5B shows a corresponding data rate curve for each head. In order to maintain the user density at a given level for the first magnetic head, for which the PW50 values of are larger, the data rate curve at any location on the disk must be relatively low and the data rate must change more frequently, i.e., the HDD must use more data rate change points. For the second magnetic head, on the other hand, for which the PW50 values are lower, the data rate curve can be higher and there can be relatively fewer data rate change points.

Figure 6:
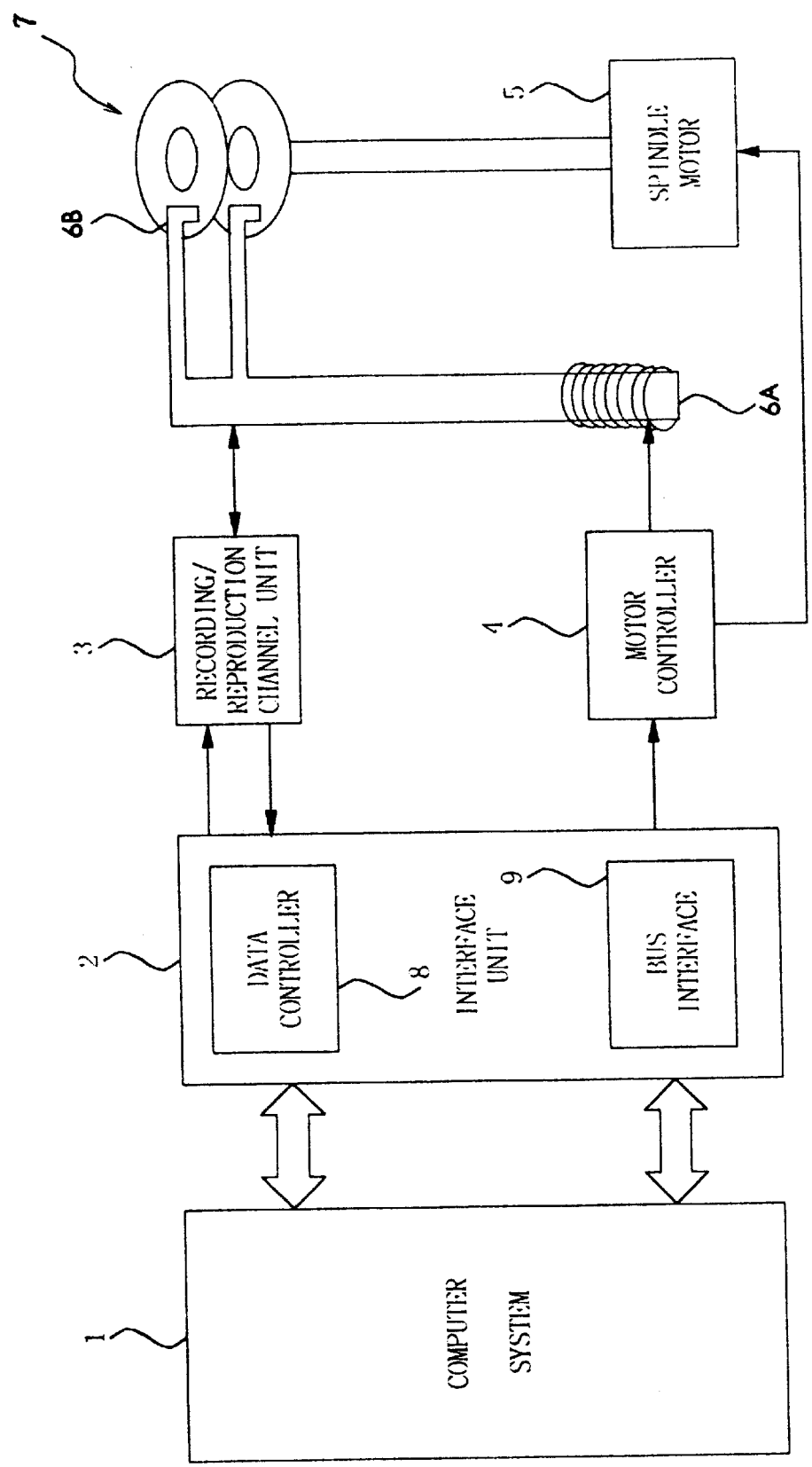
FIG. 6 is a block diagram illustrating the basic components of a generic HDD.

FIG. 6 shows the basic components of an HDD that constitutes a particular application environment for the present invention. A computer system 1 interfaces with the HDD through an interface unit 2. Interface unit 2 includes a data controller 8 for converting parallel data from computer system 1 into serial data and outputting the converted serial data for recording on a magnetic disk 7. Data controller 8 also converts serial data reproduced from magnetic disk 7 into parallel data and outputs the converted parallel data to computer system 1. Interface unit 2 also includes a bus interface 9 for outputting information regarding the status of the HDD to computer system 1.

A recording/reproduction channel unit 3 for records data on and reproduces data from magnetic disk 7. Recording/reproduction channel unit 3 sends the serial data provided by data controller 8 to a magnetic head 6B, which records the serial data on magnetic disk 7, and transfers serial data reproduced from magnetic disk 7 by magnetic head 6B to data controller 8. A motor controller 4 drives a spindle motor 5, which in turn drives the rotation of magnetic disk 7, in response to output signals from bus interface 9. Motor controller 4 also drives a voice coil motor (VCM) 6A, which positions magnetic head 6B in specified positions on magnetic disk 7.

The operation of an HDD such as that depicted in FIG. 6 will now be described. First, when computer system 1 outputs parallel data to be recorded by the HDD, it also outputs a record control signal. Bus interface 9 transfers the record control signal from computer system 1 to motor controller 4. In response to the record control signal from bus interface 9, motor controller 4 drives VCM 6A to position magnetic head 6B at a desired position on magnetic disk 7. The desired position is the selected position at which the parallel data from computer system 1 is to be recorded. Motor controller 4 also drives the spindle motor 5 to rotate magnetic disk 7 so that the data can be properly recorded. Data controller 8 converts the parallel data from computer system 1 into serial data, which is then applied to magnetic head 6B through recording/reproduction channel unit 3 for recording on the disk.

If computer system 1 outputs a reproduction control signal, thereby directing the HDD to reproduce desired data previously recorded on the magnetic disk 7, then bus interface 9 also transfers the reproduction control signal from computer system 1 to motor controller 4. In response to the reproduction control signal, motor controller 4 drives VCM 6A to move magnetic head 6B to a specified position on magnetic disk 7 from which the desired data is to be reproduced. Spindle motor 5 rotates magnetic disk 7, and magnetic head 6B reproduces the desired data from magnetic disk 7. Data controller 8 receives the reproduced data from magnetic disk 7 through recording/reproduction channel unit 3, converts the received data into parallel data, and outputs the converted parallel data to computer system 1.

Figure 7:
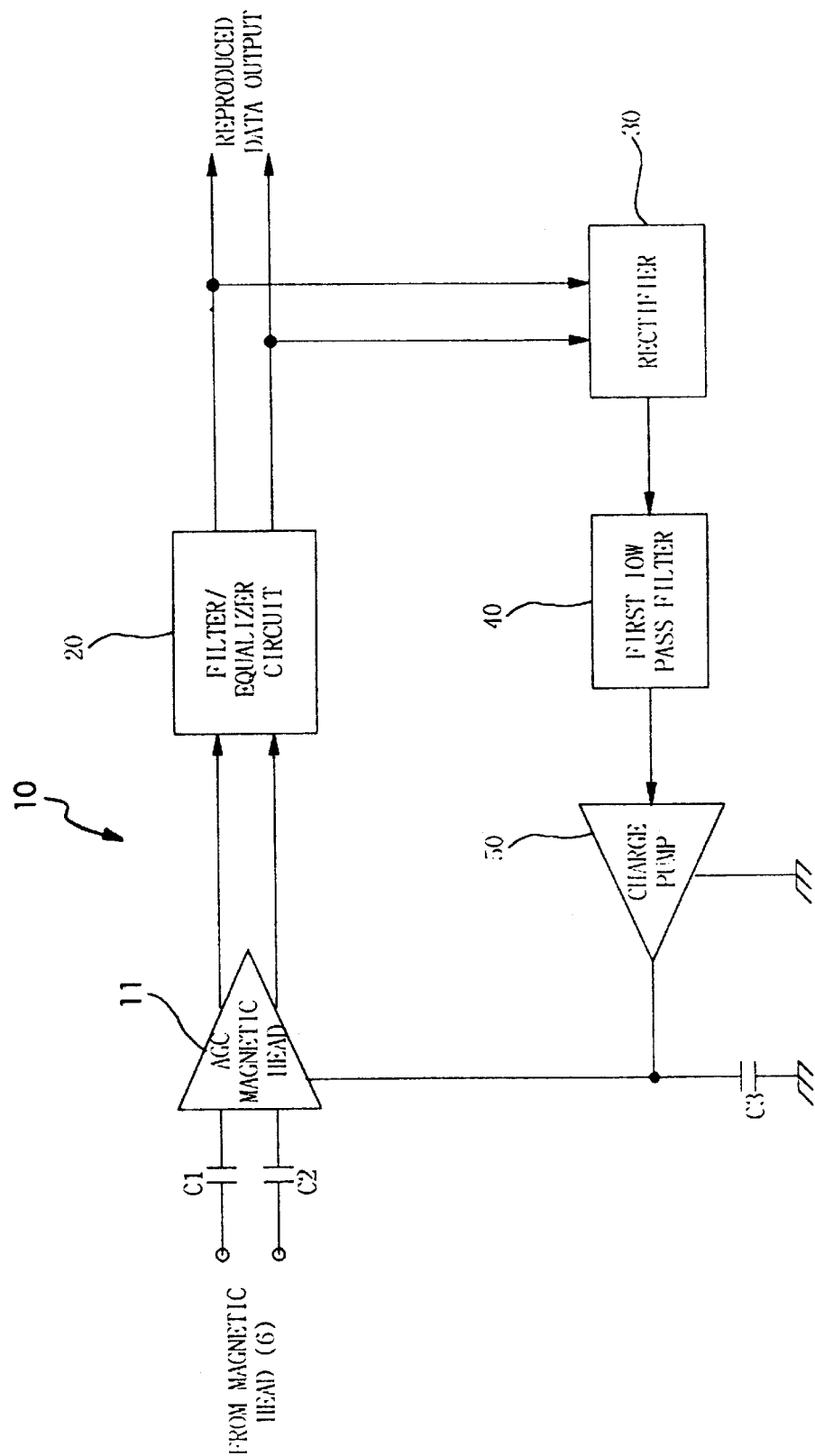
FIG. 7 is a detailed block diagram of the recording/reproduction channel unit of FIG. 6.

FIG. 7 is a block diagram of a reproduction portion 10 of recording/reproduction channel unit 3 that provides the HDD with a reproduction data channel and which constitutes a particular application environment for the present invention. This portion of recording/reproduction channel unit 3 includes an automatic gain control (AGC) amplifier 11 for amplifying serial data that magnetic head 6B reproduces from magnetic disk 7. A pre-amplifier (not shown) pre-amplifies the serial data, which then passes through capacitors C1 and C2 to AGC amplifier 10. A filter/equalizer circuit 20 receives the amplified signal from AGC amplifier 10, filters out a noise component, wave-shapes the filtered signal, and sends the resulting reproduced data output signal to interface unit 8.

A rectifier 30 provides full-wave rectification of the output signal from filter/equalizer circuit 20 and sends its rectified output signal to a first low pass filter 40. Low-pass filtering of output signal from the rectifier 30 generates an output signal corresponding to an average value of the rectified signal. A charge pump 50 generates a gain control signal in response to the output signal from first low pass filter 40, and a capacitor C3 stores the output signal from charge pump 50. Capacitor C3 thereby controls the amplification gain of AGC amplifier 11 in accordance with the average value represented by the output signal of first low pass filter 40. This configuration of reproduction portion 10 therefore includes an amplitude stabilization loop that provides a reproduced data output signal with an amplitude stabilized to a predetermined reference voltage.

The operation of reproduction portion 10 will now be described. First, the pre-amplifier (not shown) amplifies serial data reproduced from magnetic disk 7 by magnetic head 6. Capacitors C1 and C2 remove a direct current (DC) bias component from the pre-amplified output signal from the pre-amplifier. AGC amplifier 11 amplifies the resulting de-biased signal by a gain based on the charged voltage held by capacitor C3. Filter/equalizer circuit 20 removes a noise component from the amplified signal output from the AGC amplifier 11 and wave-shapes the resultant signal to restore the principal features of the data signal as originally recorded. Data controller 8 then transfers the restored, reproduced data output signal from filter/equalizer circuit 20 to computer system 1.

The signal output from filter/equalizer circuit 20 is also full-wave rectified by rectifier 30 and then low-pass filtered by first low pass filter 40. Through the filtering operation first low pass filter 40 generates a low-pass filtered output signal that represents an average value of the rectified signal output from rectifier 30. Charge pump 50 responds to the low-pass filtered signal, in accordance with this average value, by discharging or charging capacitor C3 with a desired voltage. This voltage controls the amplification gain of AGC amplifier 11, again in accordance with the average value of the rectified signal from rectifier 30, to maintain the output signal from AGC amplifier 11 at a constant amplitude.

A First Aspect of the Invention

Figure 8:
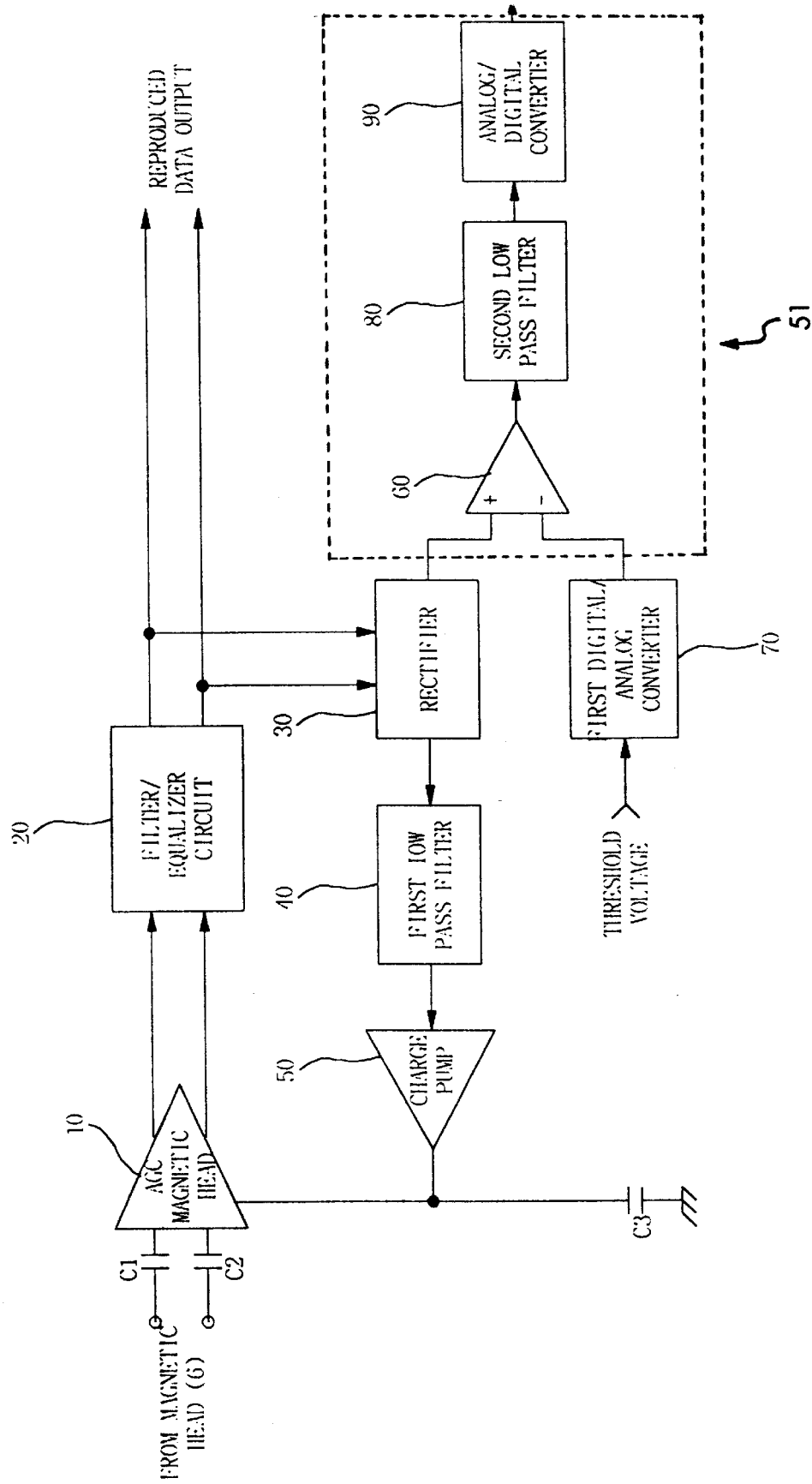
FIG. 8 is a block diagram of an apparatus for measuring a characteristic pulse width for an HDD in accordance with a first embodiment of the present invention.

FIG. 8 is a block diagram of an apparatus 51 for measuring a characteristic pulse width of the reproduction data channel of the HDD in FIG. 6 in accordance with a first embodiment of the present invention. It should be noted that reproduction portion 10 of recording/reproduction channel unit 3 provides a particular environment for application of this embodiment of the invention. Persons skilled in the signal processing arts will observe that other application environments for this and other embodiments of the present invention will be found in various data handling technologies in addition to the technology of hard disk drives.

Apparatus 51 comprises a first digital/analog converter 70 for converting into an analog voltage signal a predetermined digital threshold voltage selected for detection of a PW50 value. A first comparator 60 compares the output signal from rectifier 30 with the analog voltage signal and generates a pulse signal corresponding to a component of the rectified signal higher in level than the threshold voltage. A second low pass filter 80 low-pass filters the pulse signal from first comparator 60 and generates an average value signal representative of an average value of the pulse signal. An analog/digital converter 90 for converts the average value signal into a digital signal that is sent to a microprocessor (not shown).

Figure 14:
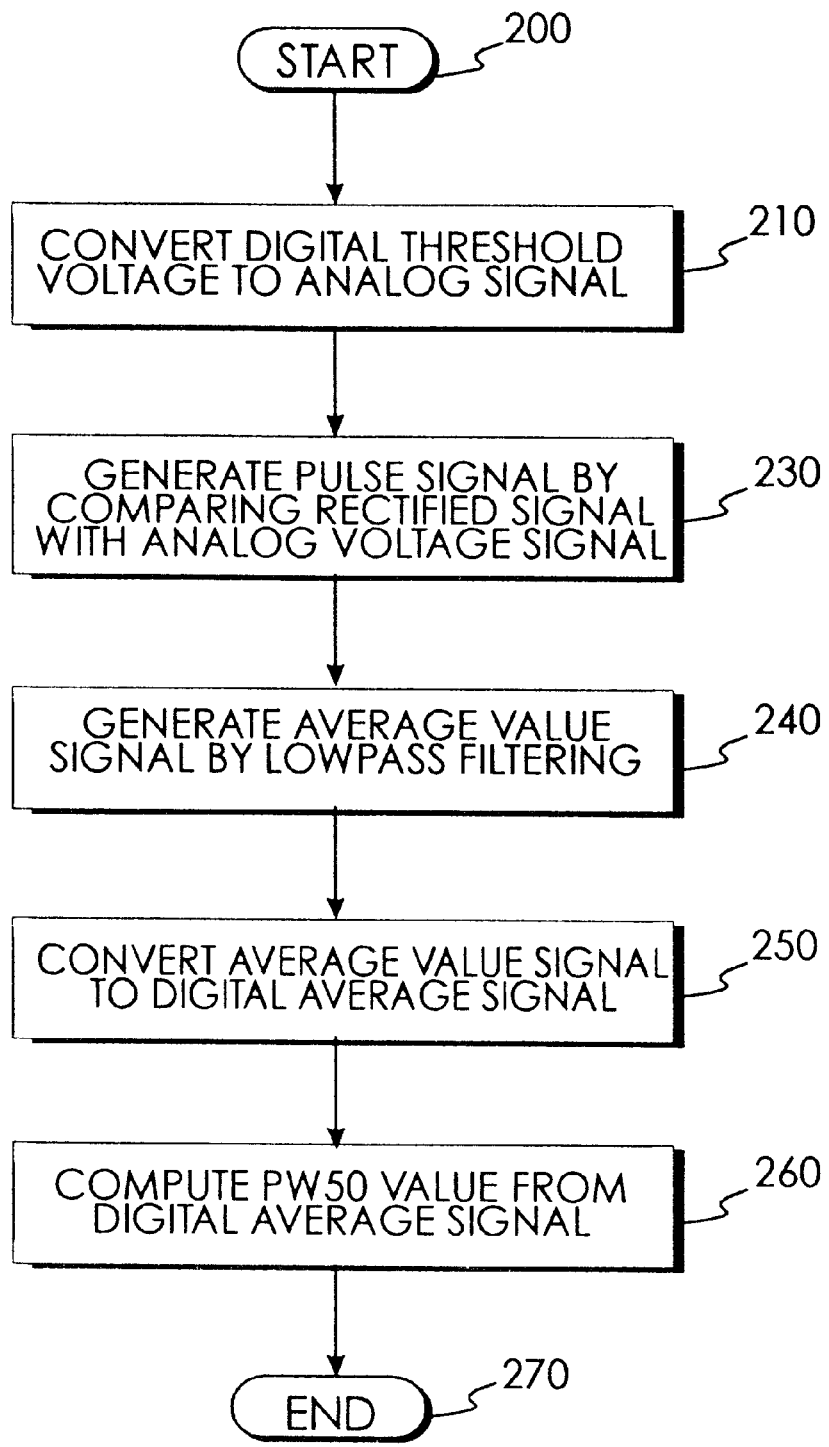
FIG. 14 is a flow diagram of a signal processing method carried out by the apparatus of FIG. 8.

The operation of apparatus 51 will now be described with reference to FIGS. 9A to 9E and FIGS. 10A to 10E. FIGS. 9A to 9E show waveform diagrams of the output signals of various components shown in FIG. 8 for the case where the PW50 value of the data channel provided by reproduction portion 10 is relatively large. In a similar manner, FIGS. 10A to 10E show waveform diagrams of corresponding output signals for the case where the PW50 value is smaller. The flow diagram shown in FIG. 14 illustrates an exemplary method for measuring a characteristic pulse width, such as a PW50 value, according to the principles of the present invention.

1. THE CASE WHERE THE PW50 VALUE IS RELATIVELY LARGE

Figure 9A:
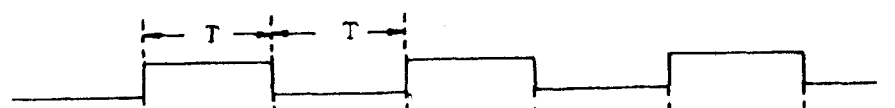
FIGS. 9A to 9E are waveform diagrams of output signals from components in FIG. 8 for a typical case where the PW50 value is relatively large.

The procedure applies to a particular magnetic head 6B, a particular magnetic disk 7, and a selected position on magnetic disk 7 for which the PW50 value is to be measured. Magnetic head 6B is first moved to the selected position and current with a predetermined pulse interval T, as shown in FIG. 9A, is applied to magnetic head 6B. This operation records a reference datum on the magnetic disk 7 so that a calibrated PW50 value can be generated.

Figure 9B:
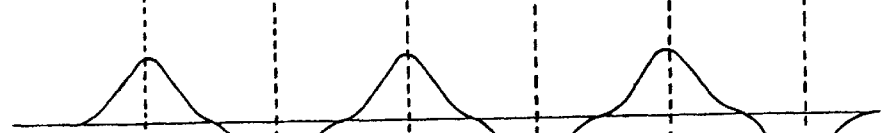

With the reference datum in place, a data signal representing the reference datum is reproduced from magnetic disk 7 by magnetic head 6B and amplified by a pre-amplifier (not shown). The pre-amplified data signal has a waveform as depicted in FIG. 9B. The particular features of this waveform depend principally on the characteristic pulse width associated with the particular combination of magnetic head 6B and magnetic disk 7. That is, one particular head/disk combination may yield an output signal from the pre-amplifier with the relatively wide pulse shown in FIG. 9B, which corresponds to a relatively large PW50 value. A different particular head/disk combination, on the other hand, may produce a signal with a narrower pulse such as that shown in FIG. 10B, to which corresponds a smaller PW50 value.

Figure 9C:
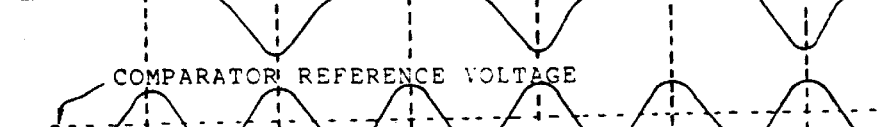

An exemplary method for PW50 measurement, as illustrated by the flow diagram of FIG. 14, may begin at this stage with a start step 200. First digital/analog converter 70 converts the predetermined digital threshold voltage into an analog voltage signal at step 210. The rectified signal from rectifier 30, as shown in FIG. 9C, and the analog voltage signal, as a reference voltage, are applied to a non-inverting input terminal (+) and an inverting input terminal (−), respectively, of first comparator 60. At step 230 first comparator 60 compares the levels of the rectified signal and the analog voltage signal and outputs a pulse signal, shown in FIG. 9D, in accordance with the result of the comparison.

Figure 9D:
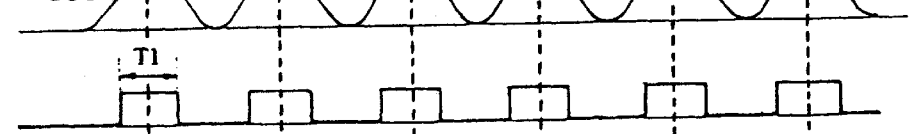
Figure 9E:
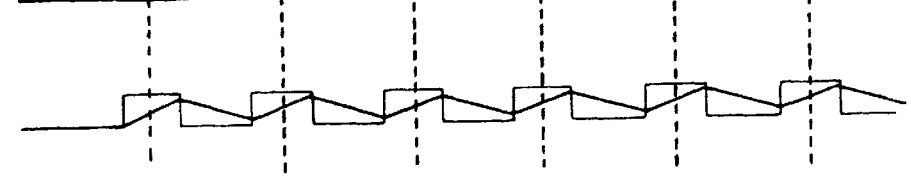

The pulse signal shown in FIG. 9D has a pulse width T1 corresponding to the desired PW50 value. Measurement of T1 proceeds in the following manner. At step 240 of FIG. 14, second low pass filter 80 low-pass filters the pulse signal from first comparator 60 and generates therefrom an average value signal as shown in FIG. 9E. This average value signal represents an average value that is proportional to the ratio of the pulse signal width T1 to the pulse signal period T. The average value signal is converted at step 250 into a digital signal by analog/digital converter 90. A microprocessor (not shown), which controls the operation of the HDD, receives this digital signal. At step 260 the microcomputer executes routine computations to calculate the PW50 value from the average value represented by the digital signal from analog/digital converter 90. The procedure then terminates at step 270.

2. THE CASE WHERE THE PW50 VALUE IS SMALLER

FIG. 10 illustrates waveforms of the corresponding output signals for a case where the PW50 value is smaller. This case, which necessarily results from a different head/disk combination than the previous case, will now be described with comparison between the corresponding views of FIGS. 9A to 9E and 10A to 10E. Although the same reference datum has been recorded on magnetic disk 7, the data signal reproduced here from magnetic disk 7 has a waveform as shown in FIG. 10B. This waveform has a narrower in pulse width than that shown in FIG. 9b due to the different characteristics of magnetic head 6B and magnetic disk 7 used for this case. The method for calculating the PW50 value, as exemplified by the flow diagram of FIG. 14, nevertheless proceeds in the same manner as with the previous case.

The de-biased, amplified, filtered, and shaped data signal is again full-wave rectified by rectifier 30, as shown in FIG. 10C. The rectified signal is applied to the (+) terminal of the first comparator 60, and the analog voltage signal representing the reference voltage is applied to the inverting input terminal (−). It should be noted that the predetermined digital threshold voltage applied to first digital/analog converter 70 is selected in accordance with the stabilized amplitude of the output signal of reproduction portion 10, and thus it will be the same for this case as for the previous case.

First comparator 60 compares the rectified signal level with the analog voltage signal level and outputs a pulse signal having a pulse width T2 as shown in FIG. 10D in accordance with the result thereof. It should be noted that the pulse signal as shown in FIG. 10D is narrower in width than the signal shown in FIG. 9D. Second low pass filter 80 again low-pass filters the pulse signal and generates an average value signal, as shown in FIG. 10E, representing an average value proportional to the ratio of the pulse signal width T2 to the pulse signal period T.

It should be noted that in the present case, where the PW50 value is smaller, the average value signal shown in FIG. 10E has a smaller amplitude (i.e., a lower voltage level) than that shown in FIG. 9E. This difference reflects quantitatively the fact that the width T2 of the pulse signal of FIG. 10D is narrower than the width T1 of the pulse signal of FIG. 9D. The digital signal from analog/digital converter 90 in the present case thus represents a value smaller than the corresponding value in the previous case. Because the level of this digital signal is proportional to the pulse width of the reproduced signal, the HDD control microprocessor (not shown) can calculate from it the desired PW50.

The process described above thus generates a measurement of the PW50 value for the specified position and the particular head/disk combination. The data rate change points can therefore be adjusted directly in accordance with PW50 values measured in this manner. That is, as described previously with reference to FIGS. 5A and 5B, the data rate change points are adjusted according to the properties of the particular magnetic head used. Whether the PW50 value is relatively large or is smaller, that is, despite variability in characteristics among various disk/head combinations, the apparatus and method of the present invention allows the user density of the HDD to be maintained roughly constant. The present invention therefore provides for a rapid, accurate AZO method capable of ensuring that an HDD efficiently uses the storage area of its disk while maintaining an error rate within acceptable limits.

A Second Aspect of the Invention

Figure 11:
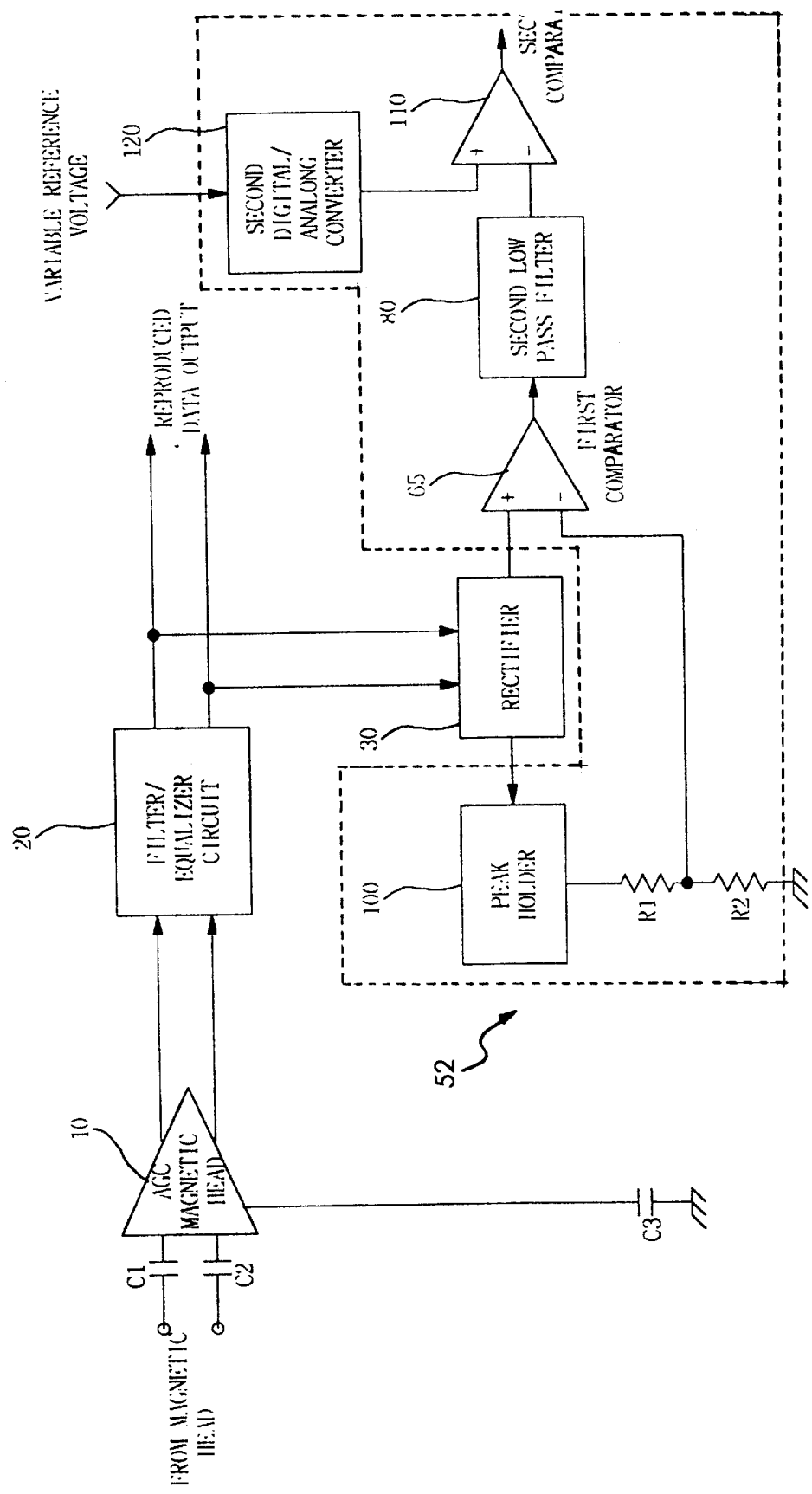
FIG. 11 is a block diagram of an apparatus for measuring a characteristic pulse width for a data channel of the HDD of FIG. 6 in accordance with an alternative embodiment of the present invention.

FIG. 11 shows a block diagram of an apparatus 52 for measuring a characteristic pulse width of a data channel in the HDD of FIG. 6 in accordance with an alternative embodiment of the present invention. The structure illustrated in FIG. 11 substantially resembles that of FIG. 8. The distinguishing features of this second embodiment include a peak holder 100, which replaces first low pass filter 40 and charge pump 50, and resistors R1 and R2, which are provided instead of first digital/analog converter 70.

Peak holder 100 is adapted to hold a peak value of the rectified signal output from the rectifier 30. Resistors R1 and R2 are selected to divide the output voltage from peak holder 100 at a desired ratio. The divided voltage is supplied to first comparator 60 as a reference signal. Upon receiving the rectified signal from rectifier 30, peak holder 100 generates a discharge signal that completely discharges a voltage charged therein. Peak holder 100 then recharges from the rectified signal and continuously maintains the charged voltage when it reaches a predetermined level.

Apparatus 52 further includes a second digital/analog converter 120, which converts a periodically variable reference voltage into an analog voltage signal; and a second comparator 110, which compares an average value signal generated by second low pass filter 80 with the analog voltage signal output from second digital/analog converter 120. It should be noted that second low pass filter 80 serves a role similar to the role served by second low pass filter 40 shown in FIG. 8. However, apparatus 52 as depicted in FIG. 11 need not include a first low pass filter such as first low pass filter 40 in FIG. 8.

The operation of apparatus 52 will be described with reference to FIGS. 12A to 12H and FIGS. 13A to 13H in a manner similar to the above description with reference to FIGS. 9A to 9E and 10A to 10E. In particular, FIGS. 12A to 12H are waveform diagrams for a disk/head combination with a relatively large PW50 value, and FIGS. 13A to 13H are corresponding diagrams for a combination with a smaller PW50 value.

1. THE CASE WHERE THE PW50 VALUE IS RELATIVELY LARGE

Figure 12A:
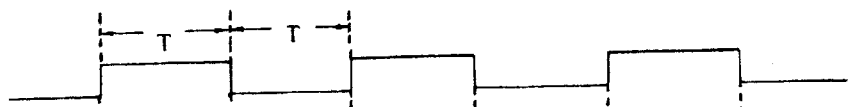
FIGS. 12A to 12H are waveform diagrams of output signals from components in FIG. 11 for a typical case where the PW50 value is relatively large.
Figure 12B:
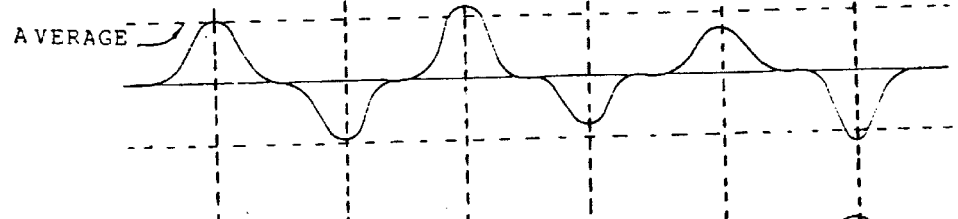

In apparatus 52 the amplification gain of the AGC amplifier 11 is determined according to a charge stored in third capacitor C3, in view of the fact that first low pass filter 40 and charge pump 50 of the first embodiment may not be provided for this purpose. For this reason, when a signal reproduced from magnetic disk 7 varies in amplitude, the output signal from the AGC amplifier 11 does not necessarily maintain a constant amplitude. A reproduced data output signal, reproduced by magnetic head 6B and passed through AGC amplifier 11 and filter/equalizer circuit 20, therefore may have neither a constant amplitude nor a constant pulse width at a given level. FIG. 12B illustrates this amplitude variability.

Figure 12C:
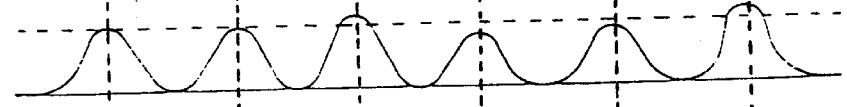
Figure 12D:
Figure 12E:
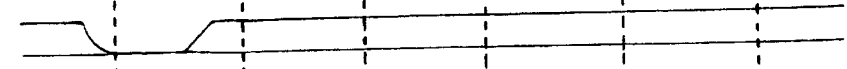
Figure 15:
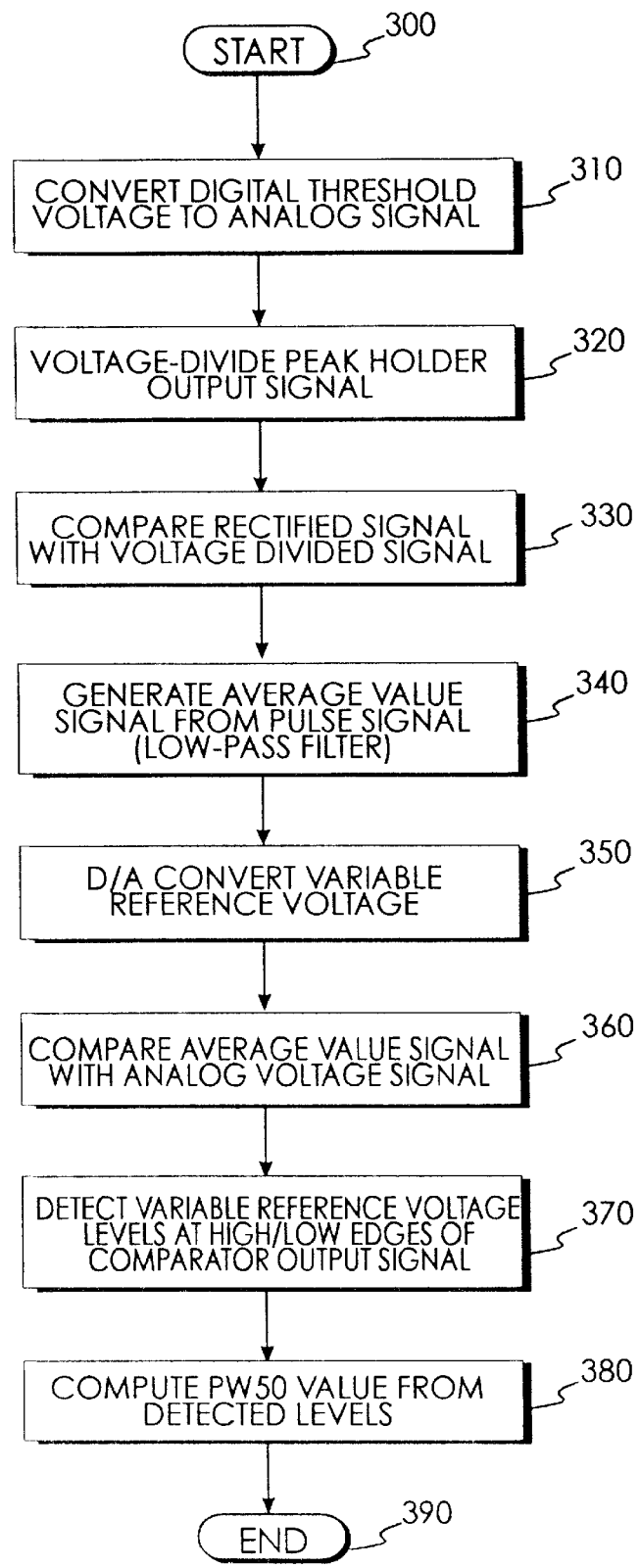
FIG. 15 is a flow diagram of a signal processing method carried out by the apparatus of FIG. 11.

A method according to the principles of this second embodiment of the present invention may proceed, for example, as illustrated by the flow diagram of FIG. 15. This procedure may start with a step 300. The output signal from filter/equalizer circuit 20 is full-wave rectified by rectifier 30, as shown in FIG. 12C, and then applied to a non-inverting input terminal (+) of first comparator 60. At step 310, peak holder 100 also receives the rectified signal and generates therefrom a discharge signal, as depicted in FIG. 12D. This discharge signal completely discharges the voltage charged in peak holder 100, as FIG. 12E illustrates. When completely discharged, peak holder 100 charges again from the rectified signal output by rectifier 30 and continuously maintains its charged voltage when that voltage reaches a predetermined level. This discharge/recharge process is depicted by the diagram shown in FIG. 12E.

At step 320, through their series configuration, resistors R1 and R2 divide the signal output from the peak holder 100.

Figure 12F:
Figure 12G:
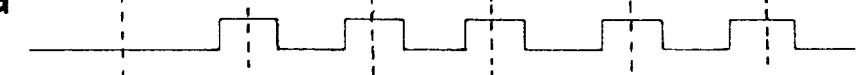
Figure 12H:
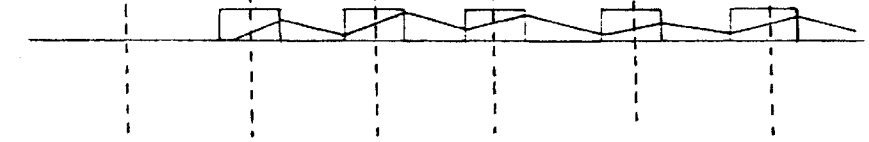

The voltage divided signal is then applied as a reference signal to the inverting input terminal (−) of first comparator 65. FIG. 12F superimposes, for visual comparison purposes, the traces of the signals seen at the non-inverting input terminal (+) and the inverting input terminal (−) of first comparator 60. Comparison step 330 then follows, wherein first comparator 60 outputs a pulse signal, as shown in FIG. 12G, in accordance with the result of its comparison of the levels of the two input signals. At step 340 second low pass filter 80 low-pass filters the pulse signal and generates therefrom an average value signal representative of an average value (i.e., a DC level), as shown in FIG. 12H. The average value signal from second low pass filter 80 is then applied to an inverting input terminal (−) of second comparator 110. Second digital/analog converter 120 converts a periodically variable reference voltage into an analog voltage signal at step 350. The analog voltage signal is applied to second comparator 110 also, at a non-inverting input terminal (+). Second comparator 110 thereby compares, at step 360, the levels of the average value signal and the analog voltage signal and outputs a high-level signal or a low-level signal in accordance with the result.

A measurement of the PW50 value is generated from the output of second comparator 110 in the following manner. At step 370, the HDD control microprocessor (not shown) detects the levels of the variable reference voltage applied to second digital/analog converter 120 simultaneously as the output signal from second comparator 110 changes from high to low and vice versa. It then calculates at step 380 the PW50 value on the basis of the detected levels of the variable reference voltage. The procedure terminates at step 390.

2. THE CASE WHERE THE PW50 VALUE IS SMALLER

FIGS. 13A to 13H illustrate waveforms corresponding to the waveforms of FIGS. 12A to 12H, but for the case where the particular head/disk combination have an associated characteristic pulse with a smaller width. A comparison of the corresponding views of FIGS. 12A to 12H and 13A to 13H will facilitate the discussion of this case. As FIG. 13B indicates, the output signal from filter/equalizer circuit 20 in this case has a substantially smaller in pulse width than that shown in FIG. 12B. It should be noted that neither the signal traced in 12B nor that in 13B has a constant amplitude or pulse width.

Figure 13A:
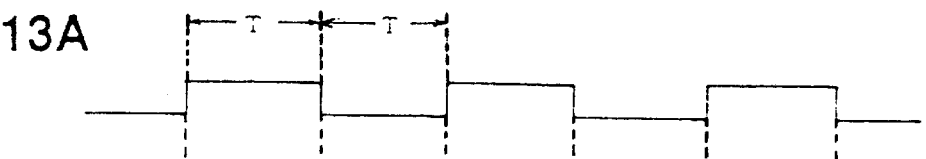
FIGS. 13A to 13H are waveform diagrams of the output signals from the components in FIG. 11 for a typical case where the PW50 value is smaller.
Figure 13B:
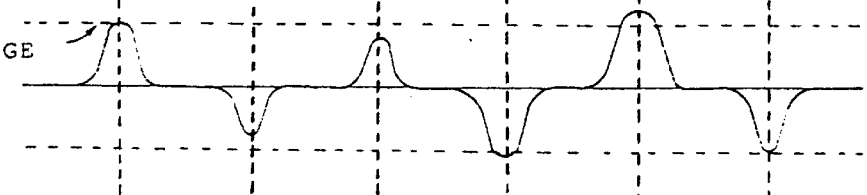
Figure 13C:
Figure 13D:
Figure 13E:
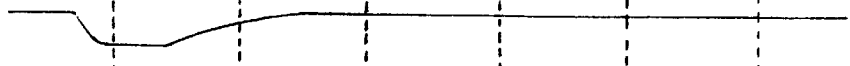
Figure 13F:
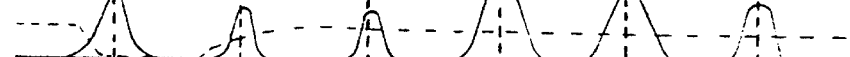

The output signal from the filter/equalizer circuit 20 is full-wave rectified, as shown in FIG. 13C, by rectifier 30. The rectified signal is then applied to the non-inverting input terminal (+) of the first comparator 60. The rectified signal is also applied to peak holder 100. FIG. 13C shows that the rectified signal for this case has a smaller pulse width than the signal traced in FIG. 12C. For this reason, as FIG. 13E indicates, more time is required here for the output voltage from peak holder 100 to reach the predetermined level than for the case illustrated in FIG. 12E. Ultimately, though, the output voltage from peak holder 100 attains the same predetermined level as shown in FIG. 12E.

Figure 13G:
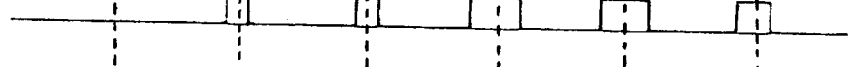

First comparator 60 compares levels of the output signals from rectifier 30 and peak holder 100 and outputs a pulse signal, as shown in FIG. 13G, in accordance with the result of the comparison. It should be noted that the pulse signal shown in FIG. 13g is narrower than the signal shown in FIG. 12g for the preceding case. Nevertheless, in each case the pulse width is proportional to the PW50 value.

Figure 13H:
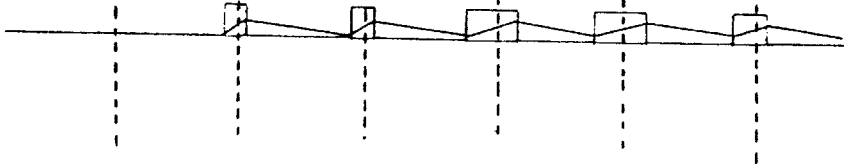

The output signal from the first comparator 60 is low-pass filtered, as FIG. 13H illustrates, by second low pass filter 80, which thereby generates an average value signal. It should be noted that the amplitude of the average value signal traced in FIG. 13H, although varying, is nevertheless smaller than that of the corresponding signal in FIG. 12H. As a result, the voltage level at the inverting input terminal (−) of the second comparator 110 in this case is lower than for the case where the PW50 value is relatively large.

Second digital/analog converter 120 converts a periodically variable reference voltage into an analog voltage signal, which is then applied to a non-inverting input terminal (+) of second comparator 110. Second comparator 110 compares the levels of the average value signal and the analog voltage signal and outputs a high or low level signal in accordance with the result thereof. The HDD control microprocessor (not shown) again detects the level of the variable reference voltages applied to second digital/analog converter 120 simultaneously as the output signals from the second comparator 110 change from high to low in level and vice versa It again calculates the PW50 value on the basis of the detected variable reference voltage levels.

It may be observed from the foregoing discussion that analog/digital converter 90 in the first embodiment of the present invention is adapted to convert the average value signal generated by second low pass filter 80 into a digital signal. This digital signal is then sent to the HDD control microprocessor for computation of PW50 value. The second embodiment of the present invention, in contrast, uses second comparator 110 and second digital/analog converter 120, instead of analog/digital converter 90, to prepare a signal from which the HDD control microprocessor can compute the PW50 value. More specifically, second comparator 110 compares the average value signal from second low pass filter 80 with the analog voltage signal generated by second digital/analog converter 120. The comparison result is output to the microprocessor for computation of the PW50 value.

The above description makes apparent that the present invention provides a characteristic pulse width measurement apparatus and method applicable to the recording/reproduction channel unit of an HDD. The invention achieves this result by obtaining a value proportional to the pulse width of the signal reproduced by the magnetic head of the HDD. This apparatus and method therefore provide a means to measure the PW50 value directly in the HDD in an improved implementation of the AZO method.

More generally, persons skilled in the signal processing arts will readily observe from the foregoing disclosure that the principles of the present invention are applicable to pulse width measurement problems in various data handling environments. In the generic situation where a data handling device receives data signals representative of digital data from a data signal source and must recover the data from the signals, there will typically arise the issue of determining a maximum data density for the data source that is commensurate with an acceptable error rate by the data handling device. In many such cases, the maximum allowable data density of the data source will depend on characteristic features of the hardware involved in the process of providing the data signals to the data handling device. Optimization of the data density will therefore depend on measuring characteristic pulse widths associated with this hardware. Thus, the present invention provides a rapid, accurate means to implement adaptive optimization procedures in any such data handling environments.

Therefore, although the preferred embodiments of the present invention have been disclosed for illustrative purposes, those skilled in the arts of signal processing will appreciate that various modifications, additions, and substitutions are possible without departing from the scope and spirit of the invention as disclosed in the accompanying claims.

What is claimed is:

1. An apparatus for measuring a characteristic pulse width for a data channel of a data handling device, said apparatus comprising:

a comparator for receiving a rectified input signal, comparing said rectified input signal to a reference signal representative of a predetermined reference voltage, and generating a pulse signal corresponding to a portion of said rectified input signal having a signal level in excess of said predetermined reference voltage, with said rectified input signal corresponding to a predetermined reference datum detected through said data channel;

a low pass filter, in communication with said comparator, for low-pass filtering said pulse signal and generating therefrom an average value signal representative of an average value of said pulse signal; and an analog-to-digital converter, in communication with said low pass filter, for converting said average value signal into a digital signal corresponding to said average value, whereby a digital processor can generate from said digital signal a pulse width value representative of said characteristic pulse width.

2. The apparatus of claim 1, wherein said reference signal is an analog voltage signal and said predetermined reference voltage is a digital voltage signal, and further comprising a digital-to-analog converter for converting said digital voltage signal into said analog voltage signal.

3. The apparatus of claim 1, further comprising:

a digital-to-analog converter for converting a variable digital reference voltage into a variable analog voltage signal; and a second comparator for comparing said average value signal to said variable analog voltage signal.

4. The apparatus of claim 1, wherein said data handling device is a hard disk drive.

5. The apparatus of claim 4, wherein said hard disk drive includes:

an amplifier for amplifying a data signal generated by a magnetic head of said hard disk drive and generating an amplified signal corresponding to said data signal, with said data signal representative of said predetermined reference datum;

an intermediate circuit for receiving said amplified signal and generating therefrom an intermediate signal; and a rectifier for generating said rectified input signal by rectifying said intermediate signal.

6. The apparatus of claim 5, wherein said amplifier is an automatic gain control amplifier and said intermediate circuit includes a filter/equalizer circuit.

7. The apparatus of claim 6, wherein said reference signal is an analog voltage signal and said predetermined reference voltage is a digital voltage signal, and further comprising a digital-to-analog converter for converting said digital voltage signal into said analog voltage signal.

8. The apparatus of claim 6, further comprising:

a digital-to-analog converter for converting a variable digital reference voltage into a variable analog voltage signal; and a second comparator for comparing said average value signal to said variable analog voltage signal.

9. An apparatus for measuring a characteristic pulse width for a data channel of a data handling device, said apparatus comprising:

reference voltage means for generating a reference voltage signal having an amplitude corresponding to a predetermined fraction of an amplitude of a rectified input signal, with said rectified input signal corresponding to a predetermined reference datum detected through said data channel;

a first comparator, in communication with said reference voltage means, for receiving said rectified input signal, comparing said rectified input signal to said reference voltage signal, and generating a pulse signal corresponding to a portion of said rectified input signal having a signal level in excess of a signal level of said reference voltage signal; and a low pass filter, in communication with said first comparator, for low-pass filtering said pulse signal and generating therefrom an average value signal representative of an average value of said pulse signal.

10. The apparatus of claim 9, wherein said reference voltage means includes:

a peak holder for holding a peak value of said rectified input signal; and a voltage divider for generating a voltage divided signal and supplying said voltage divided signal to said first comparator as said reference voltage signal, with said voltage divider generating said voltage divided signal by voltage dividing an output signal of said peak holder in accordance with said predetermined fraction.

11. The apparatus of claim 9, further comprising:

a digital-to-analog converter for converting a variable digital reference voltage into a variable analog voltage signal; and a second comparator for comparing said average value signal to said variable analog voltage signal.

12. The apparatus of claim 9, wherein said data handling device is a hard disk drive.

13. The apparatus of claim 12, wherein said hard disk drive includes:

an amplifier for amplifying a data signal generated by a magnetic head of said hard disk drive and generating an amplified signal corresponding to said data signal, with said data signal representative of said predetermined reference datum;

an intermediate circuit for receiving said amplified signal and generating therefrom an intermediate signal; and a rectifier for generating said rectified input signal by rectifying said intermediate signal.

14. The apparatus of claim 13, wherein said amplifier is an automatic gain control amplifier and said intermediate circuit includes a filter/equalizer circuit.

15. The apparatus of claim 14, wherein said reference signal is an analog voltage signal and said predetermined reference voltage is a digital voltage signal, and further comprising a digital-to-analog converter for converting said digital voltage signal into said analog voltage signal.

16. The apparatus of claim 14, further comprising:

a digital-to-analog converter for converting a variable digital reference voltage into a variable analog voltage signal; and a second comparator for comparing said average value signal to said variable analog voltage signal.

17. A method of measuring a characteristic pulse width for a data channel of a data handling device, said method comprising the steps of:

comparing a rectified input signal to an analog voltage signal and generating a pulse signal corresponding to a portion of said rectified input signal having a signal level in excess of a signal level of said analog voltage signal, with said rectified input signal corresponding to a predetermined reference datum detected through said data channel;

generating an average value signal by low-pass filtering said pulse signal, with said average value signal representative of an average of said pulse signal; and converting said average value signal into a corresponding digital signal, whereby a digital processor can generate from said digital signal a pulse width value representative of said characteristic pulse width.

18. The method of claim 17, further comprising the step of generating said analog voltage signal by digital-to-analog converting a digital threshold voltage thereinto.

19. An apparatus for measuring a characteristic pulse width for a data channel of a data handling device, said apparatus comprising:

comparator means for receiving a rectified input signal, comparing said rectified input signal to a reference signal, and generating a pulse signal;

low pass filter means connected to said comparator means for low-pass filtering said pulse signal and generating therefrom an average value of said pulse signal; and analog-to-digital converter means connected to said low pass filter means for converting said average value of said value signal into a digital signal, whereby a digital processor can generate from said digital signal a pulse width value representative of said characteristic pulse width.

20. The apparatus of claim 19, wherein said reference signal is an analog voltage signal, said apparatus further comprising digital-to-analog converter means for converting a digital voltage signal representing a predetermined reference voltage into said analog voltage signal.

21. The apparatus of claim 19, further comprising:

digital-to-analog converter means for converting a variable digital reference voltage into a variable analog voltage signal; and second comparator means for comparing said average value of said pulse signal to said variable analog voltage signal.

22. The apparatus of claim 19, wherein said data handling device is a hard disk drive.

23. The apparatus of claim 22, wherein said hard disk drive includes:

an amplifier for amplifying a data signal generated by a magnetic head of said hard disk drive and generating an amplified signal corresponding to said data signal, said data signal being representative of said predetermined reference datum;

an intermediate circuit for receiving said amplified signal and generating therefrom an intermediate signal; and a rectifier for rectifying said intermediate signal to generate said rectified input signal.

24. The apparatus of claim 23, wherein said amplifier comprises an automatic gain control amplifier and said intermediate circuit includes a filter/equalizer circuit.

25. The apparatus of claim 24, wherein said reference signal is an analog voltage signal, said apparatus further comprising digital-to-analog converter means for converting a digital voltage signal representing a predetermined reference voltage into said analog voltage signal.

26. The apparatus of claim 24, further comprising:

digital-to-analog converter means for converting a variable digital reference voltage into a variable analog voltage signal; and second comparator means for comparing said average value of said pulse signal to said variable analog voltage signal.

27. An apparatus for measuring a characteristic pulse width for a data channel of a data handling device, said apparatus comprising:

reference voltage means for generating a reference voltage signal having an amplitude corresponding to a predetermined reference datum detected through said data channel;

first comparator means connected to said reference voltage means for receiving said rectified input signal, comparing said rectified input signal to said reference voltage signal, and generating a pulse signal corresponding to a portion of said rectified input signal; and low pass filter means connected to said first comparator means for low-pass filtering said pulse signal to generate an average value of said pulse signal.

28. The apparatus of claim 27, wherein said reference voltage means includes:

a peak holder for holding a peak value of a rectified input signal corresponding to said predetermined reference datum to provide an output signal; and a voltage divider for voltage dividing an output signal of said peak holder in accordance with a predetermined fraction to generate a voltage divided signal, and supplying said voltage divided signal to said first comparator means as said reference voltage signal.

29. The apparatus of claim 27, further comprising:

digital-to-analog converter means for converting a variable digital reference voltage into a variable analog voltage signal; and second comparator means for comparing said average value of said pulse signal to said variable analog voltage signal.

30. The apparatus of claim 27, wherein said data handling device is a hard disk drive.

31. The apparatus of claim 30, wherein said hard disk drive includes:

an amplifier for amplifying a data signal generated by a magnetic head of said hard disk drive and generating an amplified signal corresponding to said data signal, said data signal being representative of said predetermined reference datum;

an intermediate circuit for receiving said amplified signal and generating therefrom an intermediate signal; and a rectifier for rectifying said intermediate signal to generate said rectified input signal.

32. The apparatus of claim 31, wherein said amplifier comprises an automatic gain control amplifier and said intermediate circuit includes a filter/equalizer circuit.

33. The apparatus of claim 32, wherein said reference signal is an analog voltage signal, said apparatus further comprising digital-to-analog converter means for converting a digital voltage signal representing a predetermined reference voltage into said analog voltage signal.

34. The apparatus of claim 32, further comprising:

digital-to-analog converter means for converting a variable digital reference voltage into a variable analog voltage signal; and second comparator means for comparing said average value of said pulse signal to said variable analog voltage signal.

35. A method of measuring a characteristic pulse width for a data channel of a data handling device, said method comprising the steps of:

comparing a rectified input signal to a reference voltage signal having an amplitude corresponding to a predetermined fraction of an amplitude of said rectified input signal and generating a pulse signal corresponding to a portion of said rectified input signal having a signal level in excess of a signal level of said reference voltage signal, with said rectified input signal corresponding to a predetermined reference datum detected through said data channel;

generating an average value signal by low-pass filtering said pulse signal, with said average value signal representative of an average value of said pulse signal; and converting said average value signal into a corresponding digital signal.

\* \* \* \* \*